US011429528B2

(12) United States Patent
Colella et al.

(10) Patent No.: US 11,429,528 B2
(45) Date of Patent: Aug. 30, 2022

(54) SPLIT CACHE FOR ADDRESS MAPPING DATA

(71) Applicant: Micron Technology, Inc., Boise, ID (US)

(72) Inventors: Nicola Colella, Capodrise (IT); Antonino Pollio, Vico Equense (IT)

(73) Assignee: Micron Technology, Inc., Boise, ID (US)

( * ) Notice: Subject to any disclaimer, the term of this patent is extended or adjusted under 35 U.S.C. 154(b) by 78 days.

(21) Appl. No.: 16/953,075

(22) Filed: Nov. 19, 2020

(65) Prior Publication Data

US 2022/0156196 A1 May 19, 2022

(51) Int. Cl.
*G06F 12/0846* (2016.01)
*G06F 12/0804* (2016.01)
*G06F 12/02* (2006.01)
*G06F 12/0891* (2016.01)

(52) U.S. Cl.
CPC ...... *G06F 12/0848* (2013.01); *G06F 12/0246* (2013.01); *G06F 12/0804* (2013.01); *G06F 12/0891* (2013.01); *G06F 2212/7201* (2013.01)

(58) Field of Classification Search
CPC ............ G06F 12/0848; G06F 12/0891; G06F 12/0246; G06F 12/0804; G06F 2212/7201
See application file for complete search history.

(56) References Cited

U.S. PATENT DOCUMENTS

| | | | |
|---|---|---|---|
| 2016/0110102 A1* | 4/2016 | Lee | G06F 13/1694 711/103 |
| 2017/0228193 A1* | 8/2017 | Olson | G06F 16/1724 |
| 2017/0262404 A1* | 9/2017 | Liang | G06F 13/16 |
| 2018/0129620 A1* | 5/2018 | Gittins | G06F 12/1027 |
| 2020/0089610 A1* | 3/2020 | Stonelake | G06F 12/0811 |

* cited by examiner

*Primary Examiner* — Sean D Rossiter
(74) *Attorney, Agent, or Firm* — Holland & Hart LLP

(57) ABSTRACT

Methods, systems, and devices for a split cache for address mapping data are described. A memory system may include a cache (e.g., including a first and second portion) for storing data that indicates a mapping between logical addresses associated with a host system and physical addresses of the memory system. The memory system may store data (e.g., the address mapping data) within the first portion of the cache. Additionally, the memory system may store an indication of whether the data is used for any access operations during a duration that the data is stored in the first portion of the cache. The memory system may transfer subsets of the data to the second portion of the cache if they are used for access operations during the duration.

25 Claims, 5 Drawing Sheets

SPLIT CACHE FOR ADDRESS MAPPING DATA

FIELD OF TECHNOLOGY

The following relates generally to one or more systems for memory and more specifically to a split cache for address mapping data.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
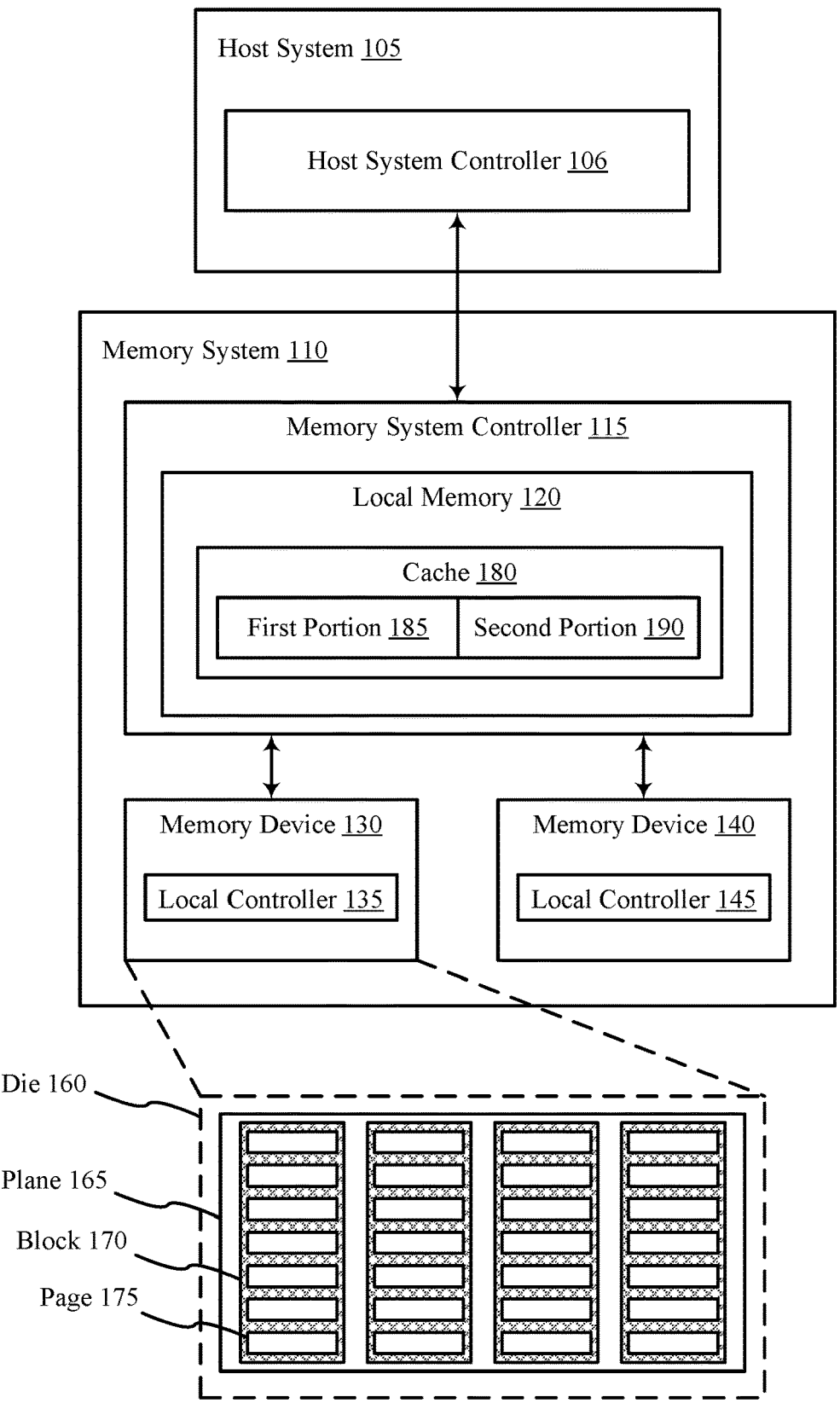
FIG. 1 illustrates an example of a system that supports a split cache for address mapping data in accordance with examples as disclosed herein.

A memory system may be in coupled with a host system, which may communicate access commands to the memory system for execution. In some cases, the host system may utilize a set of logical addresses for the access commands, while the memory system may utilize a set of physical addresses (e.g., different from the logical addresses) to execute the access commands. Here, the memory system may rely on address mapping data to determine the mapping between the logical addresses and the physical addresses. The memory system may store the address mapping data within a memory device of the memory system (e.g., using a logical-to-physical address (L2P) table or a physical address table (PPT)). When the memory system receives an access command, the memory system may access address mapping data associated with the access command to execute the access command. Thus, an amount of time associated with accessing the address mapping data may impact a latency of the memory system. That is, if the memory system accesses the address mapping data quickly, the latency of the memory system may be decreased when compared to a memory system that accesses the address mapping data less quickly.

Some memory systems may utilize a cache to store a subset of the address mapping data to decrease an amount of latency associated with accessing some address mapping data. That is, accessing address mapping data that is stored in the cache may be associated with less latency than accessing address mapping data that is stored in the memory device of the memory system. The cache, however, may not be large enough to store all of the address mapping data associated with the memory system. When the memory system receives an access command that is associated with address mapping data stored in the cache, a cache hit may occur. Alternatively, when the memory system receives an access command that is associated with address mapping data that is not stored in the cache, a cache miss may occur. In some cases, increasing a frequency of cache hits may decrease a latency associated with the memory system executing access commands. When the memory system receives an access command associated with address mapping data that is not already stored in the cache (e.g., new address mapping data associated with a cache miss), the memory system may store the new address mapping data in the cache. In some cases (e.g., when the cache is full of other address mapping data), the memory system may evict some address mapping data previously-stored in the cache to store the new address mapping data in the cache. For example, the memory system may evict address mapping data that has not been associated with as many access commands while being stored in the cache when compared to the quantity of access commands associated with other address mapping data stored in the cache.

In some memory systems, the cache may store address mapping data according to a single granularity (e.g., at 4 kilobytes (KBs)). In some other memory systems, the cache may store address mapping data according to more than one granularity. For example, the cache may include a first portion associated with a first granularity (e.g., 4 KBs) and a second portion associated with a second granularity smaller than the first granularity (e.g., 1 KB). Here, the memory system may initially store address mapping data in the first portion of the cache according to the first granularity. When the first portion of the cache is full and the memory system receives an access command associated with new address mapping data, the memory system may identify a set of address mapping data that is not associated with as many access commands as other sets of address mapping data within the cache. The memory system may then transfer one or more subsets of the identified address mapping data that have been associated with one or more access commands (e.g., while being stored in the first portion of the cache) to the second portion of the cache. The memory system may additionally evict the remaining one or more subsets of the identified address mapping data from the cache. By keeping subsets of address mapping data associated with a higher quantity of access commands stored in the cache (e.g., rather than evicting them), the memory system may increase a frequency of cache hits, thus reducing a latency associated with executing access commands. Additionally, because the cache includes the second portion associated with a smaller granularity of address mapping data than the first portion of the cache, a density of address mapping data that is used for access commands may be higher than a cache that only stores data according to the first larger granularity.

Features of the disclosure are initially described in the context of systems and dies as described with reference to FIGS. 1 and 2. Features of the disclosure are described in the context of a flow diagram as described with reference to FIG. 3. These and other features of the disclosure are further illustrated by and described with reference to an apparatus diagram and flowcharts that relate to a split cache for address mapping data as described with reference to FIGS. 4 and 5.

FIG. 1 illustrates an example of a system 100 that supports a split cache for address mapping data in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

The memory system controller 115 may additionally include a cache 180. For example, the memory system controller 115 may include a 1024 KB SRAM cache. In some cases, the cache 180 may be included within the local memory 120. In some cases, the cache 180 may be a portion of the local memory 120. In some cases, the cache 180 may be include the entirety of the local memory 120. The cache 180 may be configured to store data that indicates a mapping between logical addresses associated with the host system 105 and physical addresses of the memory system 110 (e.g., address mapping data). The memory system 110 may store an entire L2P table (e.g., including the address mapping data) at one or more of the memory devices 130 and 140. Additionally, the memory system 110 may store a subset of the address mapping data within the cache 180. In some cases, accessing address mapping data that is stored in the cache 180 may be associated with less latency than accessing address mapping data that is stored in the memory device 130 or 140. When the memory system 110 receives an access command that is associated with address mapping data stored in the cache 180, a cache hit may occur. Alternatively, when the memory system 110 receives an access command that is associated with address mapping data that is not stored in the cache 180, a cache miss may occur. In some cases, increasing a frequency of cache hits may decrease a latency associated with the memory system 110 executing access commands.

When the memory system 110 receives an access command associated with address mapping data that is not already stored in the cache 180 (e.g., new address mapping data associated with a cache miss), the memory system 110 may store the new address mapping data in the cache 180. In some cases (e.g., when the cache 180 is full of other address mapping data), the memory system 110 may evict some address mapping data previously-stored in the cache 180 to store the new address mapping data in the cache 180. For example, the memory system 110 may additionally store an indication associated with each set of address mapping data indicating whether the address mapping data has been associated with any access commands while being stored in the cache 180. Here, the memory system 110 may evict address mapping data that is associated with an indication indicating that the address mapping data has not been associated any access commands while being stored in the cache 180. Additionally or alternatively, the indication may indicate a quantity of access operations the set of address mapping data has been associated with while being stored in the cache 180. Here, the memory system 110 may evict address mapping data has been used for less access operations while being stored in the cache 180 when compared to the quantity of access commands associated with other address mapping data stored in the cache 180. In either case, evicting the address mapping data from the cache 180 may enable the memory system 110 to store the new address mapping data in the cache 180.

The cache 180 may include a first portion 185 that is configured to store address mapping data according to a first granularity (e.g., 2 KBs, 4 KBs, 8 KBs, 16 KBs). The memory system controller 115 may transfer address mapping data from the memory devices 130 or 140 to the first portion 185 of the cache 180 according to the first granularity. In some cases, each set of address mapping data (e.g., that includes the first granularity of address mapping data) may include address mapping information for a defined quantity of physical addresses of the memory device 130 or 140. For example, each set of 4 KBs of address mapping data may include address mapping information for an address space of the memory device 130 or 140 that is configured to store 1 megabyte (MB) of data.

In some cases, an access command received from the host system 105 may indicate only a subset of the 1 MB of data associated with the address mapping data. In some other cases, an access command received from the host system 105 may indicate data (e.g., by a set of logical addresses) that is associated with a set of noncontiguous physical addresses. Here, the memory system 110 may access multiple sets of address mapping data to identify the mapping between the logical addresses and the physical addresses for the access command. In either case, the memory system 110 may transfer address mapping data to the cache 180 according to the granularity (e.g., 4 KBs) and one or more subsets of the address mapping data may not be associated with the access command. In an example where the cache 180 only stores data according to the first granularity, the cache 180 may include address mapping data that is rarely used for access operations. For example, in order to ensure that a 1 KB subset of address mapping data remains in the cache 180, the cache 180 may be configured to store the 4 KB set of address mapping data that includes the 1 KB subset of address mapping data. Here, the cache 180 may be storing 3 KBs of address mapping data that is rarely used for access operations.

In the example of the memory system 110, the cache 180 may include a second portion 190 of the cache 180 configured to store data according to a second granularity that is less than the first granularity. Thus, the memory system 110 may transfer subsets of address mapping data that are used for access operations from the first portion 185 of the cache 180 to the second portion 190 of the cache 180 prior to evicting the set of address mapping data from the first portion 185 of the cache 180. For example, the memory system 110 may store (e.g., in the first portion 185 of the cache 180) an indication, for each subset of the address mapping data, of whether the subset of address mapping data is used for an access operation while the address mapping data is stored in the first portion 185 of the cache 180. Thus, when evicting a set of address mapping data from the first portion 185 of the cache 180 (e.g., due to the first portion 185 of the cache 180 being full), the memory system 110 may first transfer one or more subsets of the set of address mapping data to the second portion 190 of the cache 180 based on the one or more subsets being indicated as being used for an access operation while stored in the first portion 185 of the cache 180. This may increase a density of address mapping data that is used for access operations which may, in turn, increase a frequency of cache hits and decrease a frequency of cache misses associated with the cache 180. In some cases, this may result in a decrease in latency associated with access operation execution at the memory system 110.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support a split cache for address mapping data. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform one or more associated functions as described herein.

Figure 2:
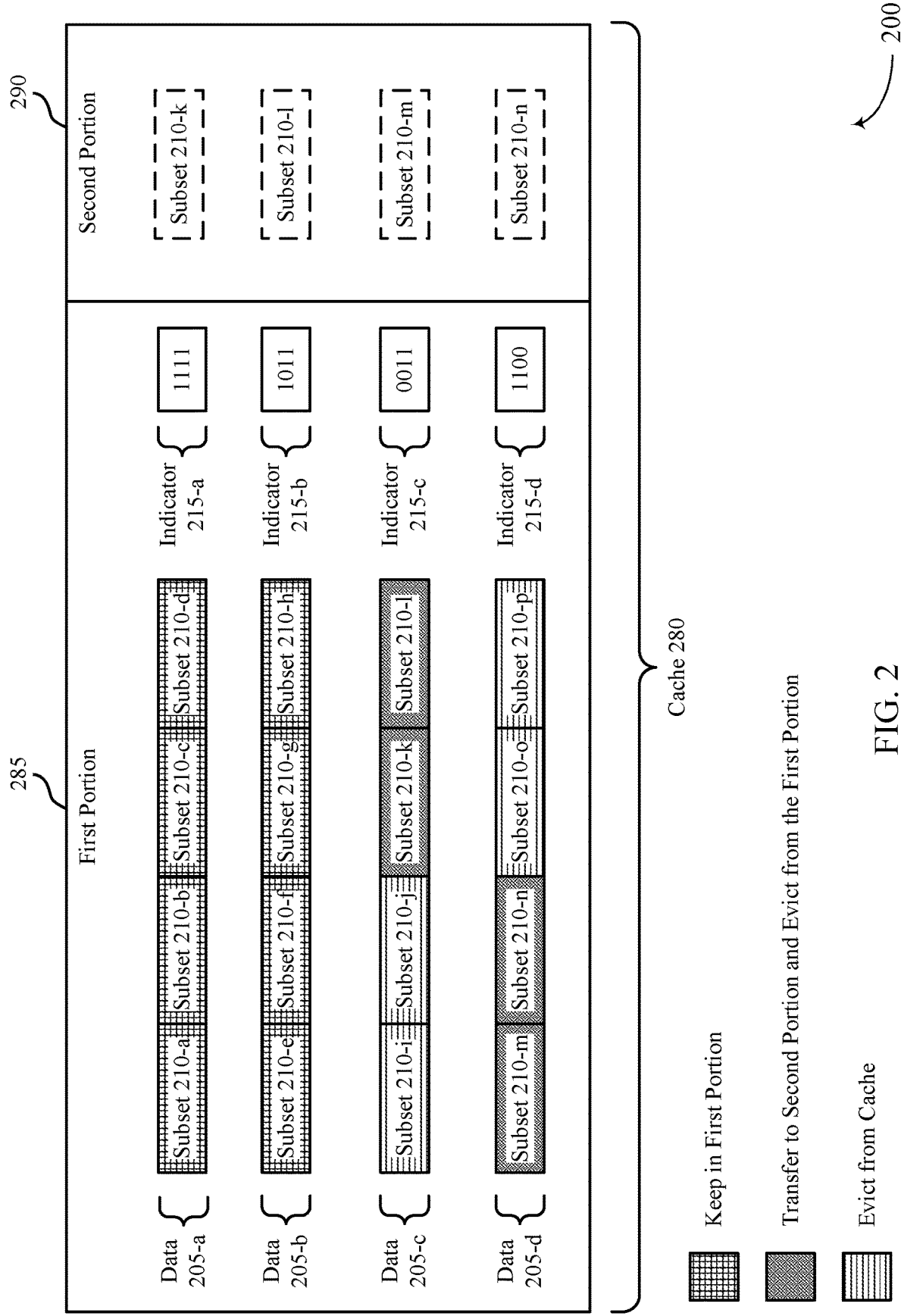
FIG. 2 illustrates an example of a system that supports a split cache for address mapping data in accordance with examples as disclosed herein.

FIG. 2 illustrates an example of a system 200 that supports a split cache for address mapping data in accordance with examples as disclosed herein. The system 200 may implement aspects of the system 100. For example, the system 200 may include a cache 280, a first portion 285, and a second portion 290, which may be examples of the cache 180, the first portion 185, and the second portion 190, respectively, as described with reference to FIG. 1.

The first portion 285 may be configured to store data 205 according to a first granularity. For example, the first portion 285 may be configured to store data 205 according to a 4 KB granularity. Here, each set of data 205 may include 4 KBs of data. Additionally, the data 205-a may be address mapping data as described with reference to FIG. 1. That is, each set of data 205 (e.g., data 205-a, data 205-b, data 205-c, and data 205-d) may indicate a mapping between logical addresses associated with a host system and physical addresses of a memory system. Additionally, each set of data 205 may indicate a mapping between a set of logical addresses and physical addresses that are span an address space that is based on the size of the data 205. For example, if the data 205 includes 4 KBs of data, the data 205 may indicate a mapping between logical and physical addresses that span a 1 MB address space. That is, the logical and physical addresses associated with the data 205 may be configured to store 1 MB of data.

Each set of data 205 may additionally include more than one subset of data 210. In the example of system 200, each set of data 205 includes four subsets of data 210. In other examples, each set of data 205 may include more or less than four subsets of data 210. Each subset of data 210 may correspond to a subset of the address space associated with the data 205. For example, if the set of data 205-a is associated with a 1 MB address space, each subset of data 210-a, 210-b, 210-c, and 210-d may span 256 KBs. The cache 280 may additionally include a second portion 290 that is configured to store data 205 according to a second granularity that is less than the first granularity (e.g., associated with the first portion 285 of the cache 280) and equal to a size of each subset of data 210. For example, if each subset of data 210 includes 1 KB of data, the granularity of the second portion 290 of the cache 280 may be 1 KB. In another example, if each set of data 205 includes 4 KBs of data and two subsets of data 210 each including 2 KBs of data, the granularity of the second portion 290 of the cache 280 may be 2 KB. In some cases, the cache 280 may be configured to store 1 MB of data 205. For example, the first portion 285 of the cache 280 may be configured to store 768 KBs of data 205 and the second portion 290 of the cache 280 may be configured to store 256 KBs of data.

The memory system may additionally store an indicator 215 associated with each set of data 205 (e.g., a hit flag). For example, the indicator 215 may be associated with the data 205-a. Additionally, the indicator 215-b may be associated with the data 205-b. Each indicator 215 stored within the first portion 285 of the cache 280 may indicate whether the data 205 is used for an access operation during a duration that the data 205 is stored within the first portion 285 of the cache 280. Additionally, each indicator 215 may include a bit associated with each subset of data 210. For example, the indicator 215-c may include four bits, each associated with one of the four subsets of data 210 within the data 205-c. That is, the first bit '0' within the indicator 215-c may be associated with the subset of data 210-i; the second bit '0' within the indicator 215-c may be associated with the subset of data 210-j; the third bit '1' within the indicator 215-c may be associated with the subset of data 210-k; and the fourth bit '1' within the indicator 215-c may be associated with the subset of data 210-l. Thus, each indicator 215 may indicate whether each subset of data 210 has been used for an access operation during the duration that the subset of data 210 is stored in the first portion 285 of the cache 280. In some cases, a logic value '0' within the indicator 215 may indicate that the subset of data 210 has not been used for an access operation while the subset of data 210 is stored in the first portion 285 of the cache 280 while a logic value '1' within the indicator 215 may indicate that the subset of data 210 has been used for an access operation while the subset of data 210 is stored in the first portion 285 of the cache 280.

When a memory system (e.g., as described with reference to FIG. 1) receives an access command, the memory system may determine whether the set of logical addresses indicated by the access command is associated with data 205 within the cache 280. In a case where the cache 280 does include the data 205 associated with the access command, a memory controller (e.g., as described with reference to FIG. 1) may identify one or more physical addresses associated with one or more logical addresses based on the mapping indicated by the data 205 stored in the cache 280. In a case that the data 205 used by the access operation is stored in the first portion 285 of the cache 280, the memory system may then update the value of the indicator 215 associated with the data 205 to indicate that the data 205 is used for an access operation. For example, if the memory system receives an access command associated with each subset of data 210 of the data 205-*a*, the memory system may set each bit within the indicator 215-*a* to a logic value '1.' In another example, if the memory system receives an access command associated with the subset of data 210-*o* and the subset of data 210-*p* of the data 205-*d*, the memory system may update the bits within the indicator 215-*d* associated with subsets of data 210-*o* and 210-*p* to a logic value '1.' In another case that the data 205 used for the access operation is a subset of data 210 stored in the second portion 290 of the cache 280, the memory system may not update any indicator associated with the subset of data 210. That is, the memory system may not store an indicator in the cache 280 associated with subsets of data 210 stored in the second portion 290 of the cache 280.

In a case where the cache 280 does not include data 205 associated with the access command, the memory controller may identify one or more physical addresses associated with one or more logical addresses based on the mapping indicated by data 205 that is not stored in the cache 280 (and is instead stored in a memory device of the memory system as described with reference to FIG. 1). The memory system may then transfer the data 205 associated with the access command from the memory device to the first portion 285 according to the first granularity. For example, if the memory system receives an access command that uses the data 205-*b* and the memory system determines that the cache 280 fails to include the data 205-*b*, the memory system may store the data 205-*b* in the first portion 285 of the cache 180. Additionally, the memory system may set the indicator 215 associated with the data 205 to indicate that the data 205 has not been used by an access operation while the data 205 is stored in the first portion 285 of the cache 280 (e.g., by setting each bit of the indicator 215 to a logic value '0').

In some instances, the memory system may have to evict data 205 from the first portion 285 of the cache 280 prior to storing new data 205 within the cache 280. For example, the cache 280 may be full of data 205 and the memory system may receive an access command using data 205 that is not currently stored in the cache 280. Here, the memory system may identify data 205 to evict from the cache 280 prior to storing the new data 205 within the first portion 285 of the cache 280. When identifying data 205 within the first portion 285 of the cache 280, the memory system may identify data 205 having less subsets of data 210 that are used for access operations than other sets of data 205 within the first portion 285 of the cache 280. For example, the memory system may identify that the data sets 205-*c* and 205-*d* have only two subsets of data 210 that were used for access operations during the duration that the data sets 205-*c* and 205-*d* were stored in the first portion 285 of the cache 280, which is less than both the data sets 205-*a* and 205-*b*, which have four subsets of data 210 and three subsets of data 210, respectively, that were used for access operations during the duration that the data sets 205-*a* and 205-*b* were stored in the first portion 285 of the cache 280.

After identifying one or more sets of data 205 to evict from the first portion 285 of the cache 280, the memory system may then identify any subsets of data 210 within the data 205 that has been used for an access operation during the duration that the data 205 was stored in the first portion 285 of the cache 280. For example, the memory system may determine that the subsets of data 210-*k* and 210-*l* of the data 205-*c* were used for access operations while the data 205-*c* was stored in the first portion 285 of the cache 280 (e.g., based on the bits of the indicator 215-*c* associated with the subsets of data 210-*k* and 210-*l* having a logic value '1'). The memory system may then transfer these subsets of data 210 from the first portion 285 of the cache to be stored in the second portion 290 of the cache 280. For example, the memory system may transfer the subsets of data 210-*k* and 210-*l* to the second portion 290 of the cache 280. In another example, the memory system may determine that the subsets of data 210-*m* and 210-*n* of the data 205-*d* were used for access operations while the data 205-*d* was stored in the first portion 285 of the cache 280 (e.g., based on the bits of the indicator 215-*d* associated with the subsets of data 210-*m* and 210-*n* having a logic value '1'). Here, the memory system may transfer the subsets of data 210-*m* and 210-*n* to the second portion 290 of the cache 280.

After transferring one or more subsets of data 210 to the second portion 290 of the cache 280, the memory system may evict the associated data 205 from the first portion 285 of the cache 280. For example, after the memory system transfers the subsets of data 210-*m* and 210-*n* to the second portion 290 of the cache 280, the memory system may evict the data 205-*d* from the cache 280. In another example, after the memory system transfers the subsets of data 210-*k* and 210-*l* to the second portion 290 of the cache 280, the memory system may evict the data 205-*c* from the cache 280. After evicting the data 205 from the cache 280, the memory system may store new data 205 within the cache 280. In some cases, subsets of data 210 stored in the second portion 290 of the cache 280 may be stored in the cache 280 for a longer amount of time than the data 205 stored in the first portion 285 of the cache 280. That is, the data 205 may be evicted from the first portion of the cache 280 with a higher frequency than subsets of data 210 are evicted from the second portion 290 of the cache 280.

By transferring subsets of data 210 that are associated with access commands to the second portion 290 of the cache 280 and evicting subsets of data 210 that are not associated with access commands from the cache 280, a density of subsets of data 210 that are used for access operations stored within the cache 280 may be greater than a cache 280 that is not configured to store subsets of data 210 according to the second granularity. Thus, a frequency of cache hits associated with the cache 280 may be greater than a cache 280 that does not include a second portion 290. This may decrease a latency associated with access commands executed by a memory system including a cache similar to the cache 280 when compared to a memory system that does not include a cache similar to the cache 280.

Figure 3:
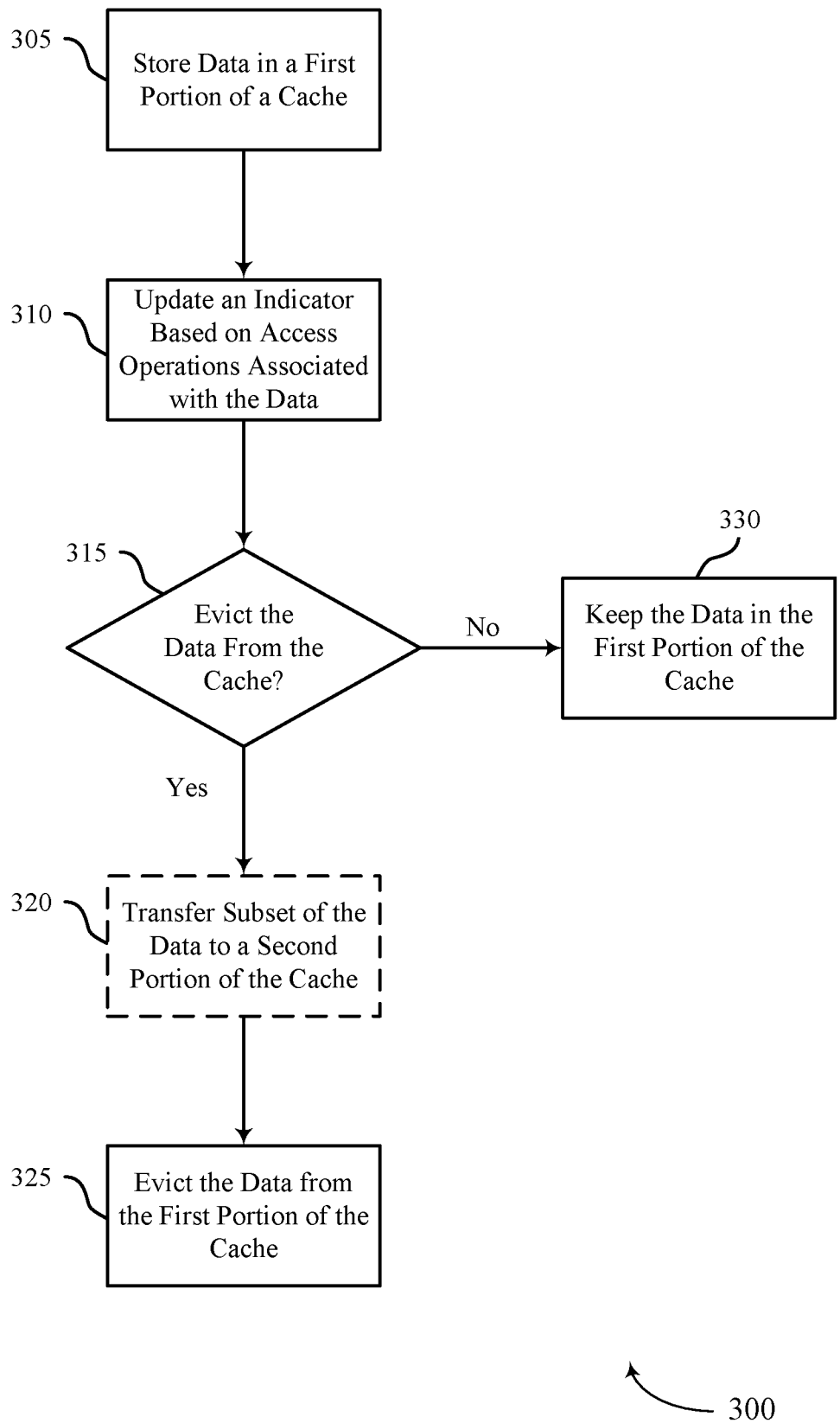
FIG. 3 illustrates an example of a flow diagram that supports a split cache for address mapping data in accordance with examples as disclosed herein.

FIG. 3 illustrates an example of a flow diagram 300 that supports a split cache for address mapping data in accordance with examples as disclosed herein. In some examples, the flow diagram 300 may implement aspects of systems 100 and 200. For example, the flow diagram 300 may be performed by a memory system controller 115 as described with reference to FIG. 1. Additionally, the flow diagram 300 may be implemented as instructions stored in the memory system controller 115 (e.g., firmware stored in the local memory 120). For example, the instructions, when executed by the controller (e.g., the memory system controller 115 as described with reference to FIG. 1), may cause the controller to perform the operations of the flow diagram 300.

At 305, data (e.g., address mapping data) may be stored in a first portion of a cache. For example, a memory system may receive an access command that uses address mapping data that is not currently stored in the cache. Thus, the memory system may store the data used by the access operation in the first portion of the cache. The cache may additionally include a second portion. Here, the first portion of the cache may be configured to store data according to a first granularity and the second portion of the cache may be configured to store data according to a second granularity that is less than the first granularity.

At 310, an indicator associated with the data may be updated based on an access operation associated with the data. That is, the memory system may receive an access command from a host system that indicates one or more logical addresses associated with the data. For example, one or more subsets of the data may indicate the mapping between the one or more logical addresses indicated by the access command to one or more physical addresses associated with the memory system. Here, the memory system may update each bit within the indicator that is associated with a subset of the data used for the access operation to store a logic value '1.' In a case that a subset of the data is not used for the access operation, the associated bit within the indicator may remain a logic value '0.'

At 315, a determination may be made as to whether to evict the data from the cache. For example, the memory system may determine whether to evict the data from the cache based on a quantity of the subsets of the data that were used for access operations while the data was stored in the first portion of the cache. For example, if the data includes four subsets of data, the indicator may include four bits. If each of the four bits is a logic value '1', the memory system may determine that the data includes four subsets of data that were used for access operations while the data was stored in the first portion of the cache. Additionally, if one of the four bits is a logic value '1' and three of the four bits is a logic value '0,' the memory system may determine that the data includes one subset of data that was used for access operations while the data was stored in the first portion of the cache (and three subsets of data that were not used for access operations). In a case that the data includes less subsets of data used for access operations than other data stored in the first portion of the cache, the memory system may proceed to 320. In a case that the data includes more subsets of data used for access operations when compared to any other data stored in the first subset of the cache, the memory system may proceed to 330.

At 320, one or more subsets of data may optionally be transferred to the second portion of the cache. For example, if any of the subsets of data were used for access operations while the data was stored in the first portion of the cache (e.g., as indicated by a logic value '1' by a bit associated with the subset), the memory system may transfer those subsets to the second portion of the cache. Alternatively, if none of the subsets of data were used for access operations while the data was stored in the first portion of the cache (e.g., as indicated by an indicator comprising bits having a logic value '0'), the memory system may refrain from transferring any subsets of the data to the second portion of the cache.

At 325, the memory system may evict the data from the first portion of the cache. Thus, only the subsets of the data that were used for access operations while the data was stored in the first portion of the cache may be stored in the cache (e.g., within the second portion of the cache) while subsets of the data that were not used for access operations while the data was stored in the first portion of the cache may be evicted from the cache entirely.

At 330, the data may be kept in the first portion of the cache. For example, the memory system may refrain from evicting the data from the from the first portion of the cache.

Figure 4:
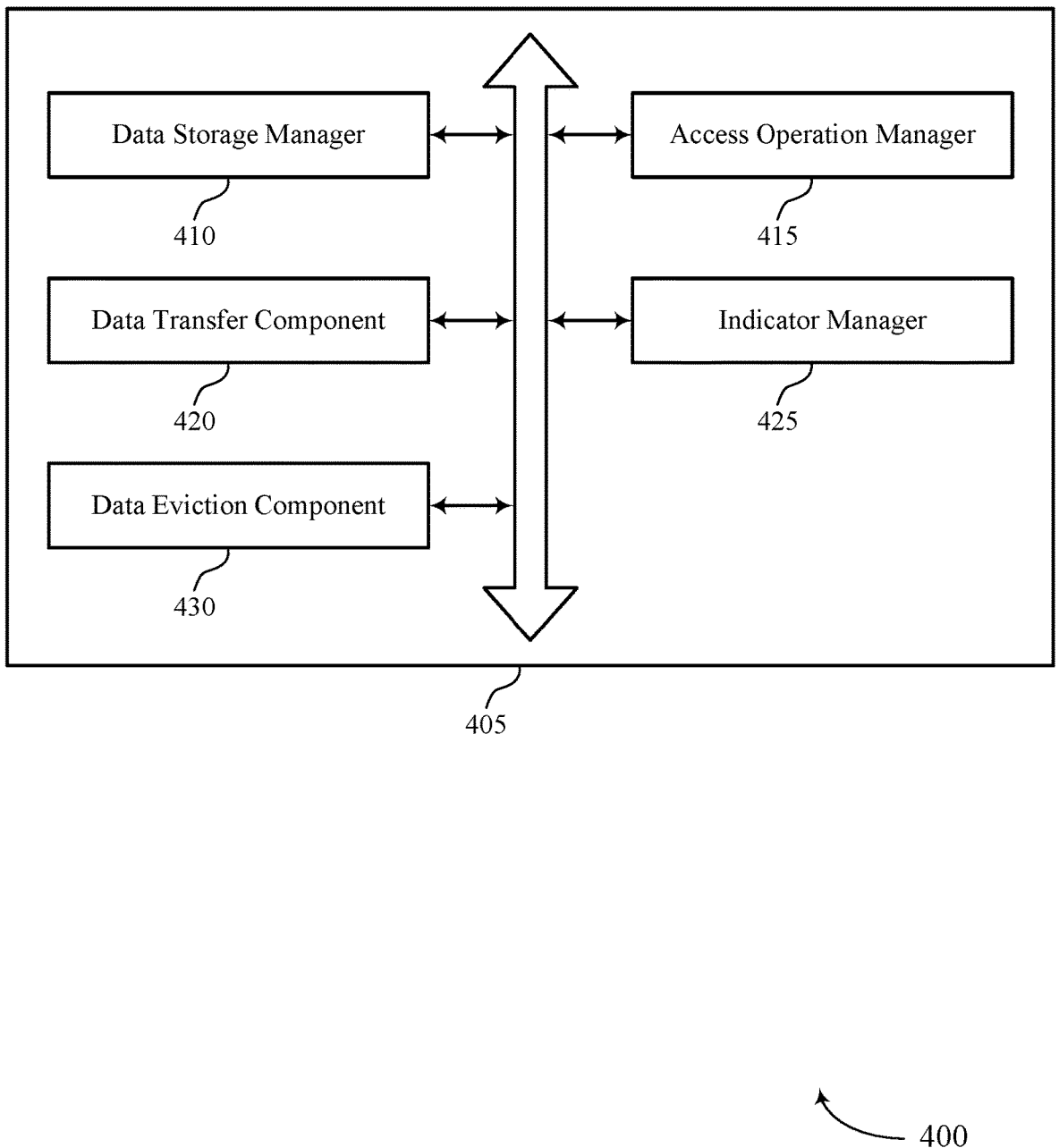
FIG. 4 shows a block diagram of a memory system that supports a split cache for address mapping data in accordance with examples as disclosed herein.

FIG. 4 shows a block diagram 400 of a memory system 405 that supports a split cache for address mapping data in accordance with examples as disclosed herein. The memory system 405 may be an example of aspects of a memory system as described with reference to FIGS. 1 through 3. The memory system 405 may include a data storage manager 410, an access operation manager 415, a data transfer component 420, an indicator manager 425, and a data eviction component 430. Each of these modules may communicate, directly or indirectly, with one another (e.g., via one or more buses).

The data storage manager 410 may store, in a first portion of a cache of a memory system, data that indicates a mapping between logical addresses associated with a host system and physical addresses of the memory system. In some examples, the data storage manager 410 may store, in the first portion of the cache of the memory system, second data that indicates a mapping between second logical addresses associated with the host system and second physical addresses of the memory system based on evicting the data. In some cases, the data includes 4 KBs of data.

The access operation manager 415 may identify a first subset of the data used for one or more access operations of the memory system during a duration that the data is stored in the first portion of the cache. In some instances, the duration may be less than a second duration that the first subset is stored in the second portion of the cache. In some examples, the first subset of the data includes less than 4 KBs of data. In some examples, the access operation manager 415 may perform an access operation using the first subset of the data based on storing the data in the first portion of the cache. In some cases, the access operation manager 415 may receive, from a controller of the memory system, a command to perform an access operation that indicates one or more logical addresses associated with the access operation.

The data transfer component 420 may transfer the first subset of the data from the first portion of the cache to a second portion of the cache based on the identifying. In some examples, the data transfer component 420 may transfer the first subset of the data based on the first portion of the cache being used to store information. In some cases, the data transfer component 420 may refrain from transferring any subset of the second data to the second portion of the cache based on identifying that a first quantity of subsets of the data used for access operations during the duration is less than a second quantity of subsets of second data used for access operations during the duration, where the second data is stored in the first portion of the cache.

The indicator manager 425 may update an indicator for indicating whether the data is used for the one or more access operations during the duration based on the identifying, where transferring the first subset of the data is based on updating the indicator.

In some examples, the indicator manager 425 may set, within an indicator associated with the data, a bit that is associated with the first subset of the data to a value indicating that the first subset of the data is used for the one or more access operations during the duration based on performing the access operation, where the identifying is based on setting the bit. In some cases, the indicator manager 425 may identify one or more physical addresses associated with the one or more logical addresses based on the mapping indicated by the first subset of the data stored in the first portion of the cache.

In some instances, the indicator manager 425 may update an indicator for indicating whether the data is used for the one or more access operations during the duration based on identifying the one or more physical addresses based on the mapping indicated by the first subset of the data. In some examples, the indicator manager 425 may identify that a first quantity of subsets of the data used for access operations during the duration is less than a second quantity of subsets of second data used for access operations during the duration, where the second data is stored in the first portion of the cache. In some cases, the indicator includes a set of bits each associated with a subset of the data. In some instances, each bit of the set of bits indicates whether the associated subset of the data is used for the one or more access operations during the duration.

The data eviction component 430 may evict the data from the first portion of the cache based on transferring the first subset of the data. In some examples, the data eviction component 430 may identify an absence of access operations associated with a second subset of the data during the duration based on a value of an indicator associated with the data, where evicting the data is based on identifying the absence of access operations.

Figure 5:
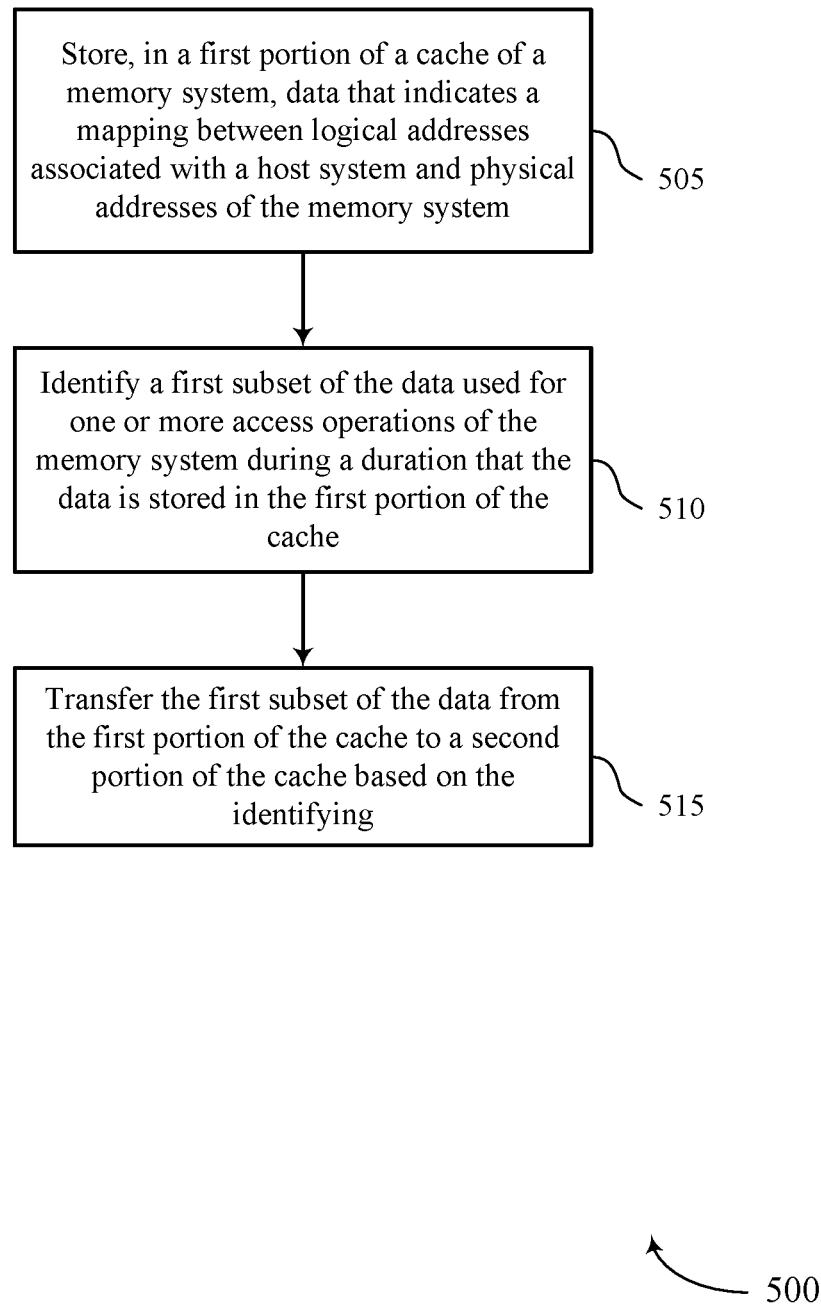
FIG. 5 shows a flowchart illustrating a method or methods that support a split cache for address mapping data in accordance with examples as disclosed herein.

FIG. 5 shows a flowchart illustrating a method or methods 500 that supports a split cache for address mapping data in accordance with examples as disclosed herein. The operations of method 500 may be implemented by a memory system or its components as described herein. For example, the operations of method 500 may be performed by a memory system as described with reference to FIG. 4. In some examples, a memory system may execute a set of instructions to control the functional elements of the memory system to perform the described functions. Additionally or alternatively, a memory system may perform aspects of the described functions using special-purpose hardware.

At 505, the memory system may store, in a first portion of a cache of a memory system, data that indicates a mapping between logical addresses associated with a host system and physical addresses of the memory system. The operations of 505 may be performed according to the methods described herein. In some examples, aspects of the operations of 505 may be performed by a data storage manager as described with reference to FIG. 4.

At 510, the memory system may identify a first subset of the data used for one or more access operations of the memory system during a duration that the data is stored in the first portion of the cache. The operations of 510 may be performed according to the methods described herein. In some examples, aspects of the operations of 510 may be performed by an access operation manager as described with reference to FIG. 4.

At 515, the memory system may transfer the first subset of the data from the first portion of the cache to a second portion of the cache based on the identifying. The operations of 515 may be performed according to the methods described herein. In some examples, aspects of the operations of 515 may be performed by a data transfer component as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for storing, in a first portion of a cache of a memory system, data that indicates a mapping between logical addresses associated with a host system and physical addresses of the memory system, identifying a first subset of the data used for one or more access operations of the memory system during a duration that the data is stored in the first portion of the cache, and transferring the first subset of the data from the first portion of the cache to a second portion of the cache based on the identifying.

Some examples of the method 500 and the apparatus described herein may further include operations, features, means, or instructions for updating an indicator for indicating whether the data may be used for the one or more access operations during the duration based on the identifying, where transferring the first subset of the data may be based on updating the indicator.

In some cases of the method 500 and the apparatus described herein, the indicator includes a set of bits each associated with a subset of the data, and each bit of the set of bits indicates whether the associated subset of the data may be used for the one or more access operations during the duration.

Some instances of the method 500 and the apparatus described herein may further include operations, features, means, or instructions for performing an access operation using the first subset of the data based on storing the data in the first portion of the cache, and setting, within an indicator associated with the data, a bit that may be associated with the first subset of the data to a value indicating that the first subset of the data may be used for the one or more access operations during the duration based on performing the access operation, where the identifying may be based on setting the bit.

Some examples of the method 500 and the apparatus described herein may further include operations, features, means, or instructions for receiving, from a controller of the memory system, a command to perform an access operation that indicates one or more logical addresses associated with the access operation, identifying one or more physical addresses associated with the one or more logical addresses based on the mapping indicated by the first subset of the data stored in the first portion of the cache, and updating an indicator for indicating whether the data may be used for the one or more access operations during the duration based on identifying the one or more physical addresses based on the mapping indicated by the first subset of the data.

Some cases of the method 500 and the apparatus described herein may further include operations, features, means, or instructions for evicting the data from the first portion of the cache based on transferring the first subset of the data.

Some instances of the method 500 and the apparatus described herein may further include operations, features, means, or instructions for storing, in the first portion of the cache of the memory system, second data that indicates a mapping between second logical addresses associated with the host system and second physical addresses of the memory system based on evicting the data.

Some examples of the method 500 and the apparatus described herein may further include operations, features, means, or instructions for identifying an absence of access operations associated with a second subset of the data during the duration based on a value of an indicator associated with the data, where evicting the data may be based on identifying the absence of access operations.

Some cases of the method 500 and the apparatus described herein may further include operations, features, means, or instructions for identifying that a first quantity of subsets of the data used for access operations during the duration may be less than a second quantity of subsets of second data used for access operations during the duration, where the second data may be stored in the first portion of the cache, and refraining from transferring any subset of the second data to the second portion of the cache based on the identifying.

Some instances of the method 500 and the apparatus described herein may further include operations, features, means, or instructions for transferring the first subset of the data may be based on the first portion of the cache being used to store information.

In some examples of the method 500 and the apparatus described herein, the duration may be less than a second duration that the first subset may be stored in the second portion of the cache.

In some cases of the method 500 and the apparatus described herein, the data includes 4 KBs of data, and the first subset of the data includes less than 4 KBs of data.

It should be noted that the methods described herein describe possible implementations, and that the operations and the steps may be rearranged or otherwise modified and that other implementations are possible. Further, portions from two or more of the methods may be combined.

An apparatus is described. The apparatus may include a memory device, a cache configured to store data that indicates a mapping between logical addresses associated with a host system and physical addresses of the memory device, the cache including a first portion configured to store data according to a first granularity and a second portion configured to store data according to a second granularity less than the first granularity, and a controller coupled with the memory device and the cache and configured to transfer data from the memory device to the first portion of the cache and transfer a first subset of the data from the first portion of the cache to the second portion of the cache based on the first subset of the data being used for one or more access operations of the memory system during a duration that the data is stored in the first portion of the cache.

In some examples, the first portion of the cache may be further configured to store an indicator for indicating whether the data may be used for the one or more access operations during the duration.

In some cases, the indicator includes a set of bits each associated with a subset of the data, and each bit of the set of bits indicates whether the associated subset of the data may be used for the one or more access operations during the duration.

In some instances, the controller may be further configured to identify a command to perform an access operation that indicates one or more logical addresses associated with the access operation, identify one or more physical addresses associated with the one or more logical addresses based on the mapping indicated by the first subset of the data stored in the first portion of the cache, and update an indicator for indicating whether the data may be used for the one or more access operations during the duration based on identifying the one or more physical addresses based on the mapping indicated by the first subset of the data.

In some examples, the controller may be further configured to evict the data from the first portion of the cache based on transferring the first subset of the data to the second portion of the cache.

In some cases, the controller may be further configured to transfer second data from the memory device to the first portion of the cache based on evicting the data.

In some instances, the controller may be further configured to identify may further include identifying an absence of access operations associated with a second subset of the data during the duration based on a value of an indicator associated with the data, where evicting the data may be based on identifying the absence of access operations.

In some examples, the memory device includes NAND memory cells.

An apparatus is described. The apparatus may include a memory array and a controller coupled with the memory array and configured to cause the apparatus to store, in a first portion of a cache of a memory system, data that indicates a mapping between logical addresses associated with a host system and physical addresses of the memory system, identify a first subset of the data used for one or more access operations of the memory system during a duration that the data is stored in the first portion of the cache, and transfer the first subset of the data from the first portion of the cache to a second portion of the cache based on the identifying.

In some examples, the controller may be further configured to update an indicator for indicating whether the data may be used for the one or more access operations during the duration based on the identifying, where transferring the first subset of the data may be based on updating the indicator.

In some cases, the indicator includes a set of bits each associated with a subset of the data, and each bit of the set of bits indicates whether the associated subset of the data may be used for the one or more access operations during the duration.

In some instances, the controller may be further configured to perform an access operation using the first subset of the data based on storing the data in the first portion of the cache, and set, within an indicator associated with the data, a bit that may be associated with the first subset of the data to a value indicating that the first subset of the data may be used for the one or more access operations during the duration based on performing the access operation, where the identifying may be based on setting the bit.

In some examples, the controller may be further configured to receive a command to perform an access operation that indicates one or more logical addresses associated with the access operation, identify one or more physical addresses associated with the one or more logical addresses based on the mapping indicated by the first subset of the data stored in the first portion of the cache, and update an indicator for indicating whether the data may be used for the one or more access operations during the duration based on identifying the one or more physical addresses based on the mapping indicated by the first subset of the data.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A non-transitory computer-readable medium storing cod; the code comprising instructions executable by a processor to:
    store, in a first portion of a cache of a memory device, data that indicates a mapping between logical addresses associated with a host system and physical addresses of the memory device;
    identify a first subset of the data used for one or more access operations of the memory device during a duration that the data is stored in the first portion of the cache; and
    transfer the first subset of the data from the first portion of the cache to a second portion of the cache of the memory device based at least in part on the identifying, wherein the first portion of the cache and the second portion of the cache each comprise a same type of memory cells.

2. The non-transitory computer-readable medium of claim 1, wherein the instructions are further executable by the processor to:
    update an indicator for indicating whether the data is used for the one or more access operations during the duration based at least in part on the identifying, wherein transferring the first subset of the data is based at least in part on updating the indicator.

3. The non-transitory computer-readable medium of claim 2, wherein:
    the indicator comprises a set of bits each associated with a respective subset of the data; and
    each bit of the set of bits indicates whether the respective subset of the data is used for the one or more access operations during the duration.

4. The non-transitory computer-readable medium of claim 1, wherein the instructions are further executable by the processor to:
    perform an access operation using the first subset of the data based at least in part on storing the data in the first portion of the cache; and
    set, within an indicator associated with the data, a bit that is associated with the first subset of the data to a value indicating that the first subset of the data is used for the one or more access operations during the duration based at least in part on performing the access operation, wherein the identifying is based at least in part on setting the bit.

5. The non-transitory computer-readable medium of claim 1, wherein the instructions are further executable by the processor to:
    receive, from a controller of the memory device, a command to perform an access operation that indicates one or more logical addresses associated with the access operation;
    identify one or more physical addresses associated with the one or more logical addresses based at least in part on the mapping indicated by the first subset of the data stored in the first portion of the cache; and
    update an indicator for indicating whether the data is used for the one or more access operations during the duration based at least in part on identifying the one or more physical addresses based at least in part on the mapping indicated by the first subset of the data.

6. The non-transitory computer-readable medium of claim 1, wherein the instructions are further executable by the processor to:
    evict the data from the first portion of the cache based at least in part on transferring the first subset of the data.

7. The non-transitory computer-readable medium of claim 6, wherein the instructions are further executable by the processor to:
    store, in the first portion of the cache of the memory device, second data that indicates a mapping between second logical addresses associated with the host system and second physical addresses of the memory device based at least in part on evicting the data.

8. The non-transitory computer-readable medium of claim 6, wherein the instructions are further executable by the processor to:
    identify an absence of access operations associated with a second subset of the data during the duration based at least in part on a value of an indicator associated with the data, wherein evicting the data is based at least in part on identifying the absence of access operations.

9. A non-transitory computer-readable medium storing code the code comprising instructions executable by a processor to:
    store, in a first portion of a cache of a memory system, data that indicates a mapping between logical addresses associated with a host system and physical addresses of the memory system;
    identify a first subset of the data used for one or more access operations of the memory system during a duration that the data is stored in the first portion of the cache;
    identify that a first quantity of subsets of the data used for access operations during the duration is less than a second quantity of subsets of second data used for access operations during the duration, wherein the second data is stored in the first portion of the cache;

transfer the first subset of the data from the first portion of the cache to a second portion of the cache based at least in part on identifying that the first quantity of the subsets of the data is less than the second quantity of the subsets of the second data; and refrain from transferring any subset of the second data to the second portion of the cache based at least in part on the identifying.

10. The non-transitory computer-readable medium of claim 1, wherein transferring the first subset of the data is based at least in part on the first portion of the cache being used to store information.

11. The non-transitory computer-readable medium of claim 1, wherein the duration is less than a second duration that the first subset is stored in the second portion of the cache.

12. The non-transitory computer-readable medium of claim 1, wherein:
the data comprises 4 kilobytes (KBs) of data; and
the first subset of the data comprises less than 4 KBs of data.

13. A memory system, comprising:
a memory device;
a cache configured to store data that indicates a mapping between logical addresses associated with a host system and physical addresses of the memory device, the cache comprising a first portion configured to store data according to a first granularity and a second portion configured to store data according to a second granularity less than the first granularity; and
a controller coupled with the memory device and the cache and configured to:
transfer data from the memory device to the first portion of the cache; and
transfer a first subset of the data from the first portion of the cache to the second portion of the cache based at least in part on the first subset of the data being used for one or more access operations of the memory device during a duration that the data is stored in the first portion of the cache, wherein the first portion of the cache and the second portion of the cache each comprise a same type of memory cells.

14. The memory system of claim 13, wherein the first portion of the cache is further configured to store an indicator for indicating whether the data is used for the one or more access operations during the duration.

15. The memory system of claim 14, wherein:
the indicator comprises a set of bits each associated with a subset of the data; and
each bit of the set of bits indicates whether the associated subset of the data is used for the one or more access operations during the duration.

16. The memory system of claim 13, wherein the controller is further configured to:
identify a command to perform an access operation that indicates one or more logical addresses associated with the access operation;
identify one or more physical addresses associated with the one or more logical addresses based at least in part on the mapping indicated by the first subset of the data stored in the first portion of the cache; and
update an indicator for indicating whether the data is used for the one or more access operations during the duration based at least in part on identifying the one or more physical addresses based at least in part on the mapping indicated by the first subset of the data.

17. The memory system of claim 13, wherein the controller is further configured to:
evict the data from the first portion of the cache based at least in part on transferring the first subset of the data to the second portion of the cache.

18. The memory system of claim 17, wherein the controller is further configured to:
transfer second data from the memory device to the first portion of the cache based at least in part on evicting the data.

19. The memory system of claim 17, wherein the controller is further configured to:
identify an absence of access operations associated with a second subset of the data during the duration based at least in part on a value of an indicator associated with the data, wherein evicting the data is based at least in part on identifying the absence of access operations.

20. The memory system of claim 13, wherein the memory device comprises NAND memory cells.

21. An apparatus, comprising:
a memory device comprising a memory array; and
a controller coupled with the memory array and configured to cause the apparatus to:
store, in a first portion of a cache of the memory device, data that indicates a mapping between logical addresses associated with a host system and physical addresses of the memory device;
identify a first subset of the data used for one or more access operations of the memory device during a duration that the data is stored in the first portion of the cache; and
transfer the first subset of the data from the first portion of the cache to a second portion of the cache of the memory device based at least in part on the identifying, wherein the first portion of the cache and the second portion of the cache each comprise a same type of memory cells.

22. The apparatus of claim 21, wherein the controller is further operable to cause the apparatus to:
update an indicator for indicating whether the data is used for the one or more access operations during the duration based at least in part on the identifying, wherein transferring the first subset of the data is based at least in part on updating the indicator.

23. The apparatus of claim 22, wherein:
the indicator comprises a set of bits each associated with a subset of the data; and
each bit of the set of bits indicates whether the associated subset of the data is used for the one or more access operations during the duration.

24. The apparatus of claim 21, wherein the controller is further operable to cause the apparatus to:
perform an access operation using the first subset of the data based at least in part on storing the data in the first portion of the cache; and
set, within an indicator associated with the data, a bit that is associated with the first subset of the data to a value indicating that the first subset of the data is used for the one or more access operations during the duration based at least in part on performing the access operation, wherein the identifying is based at least in part on setting the bit.

25. The apparatus of claim 21, wherein the controller is further operable to cause the apparatus to:
receive a command to perform an access operation that indicates one or more logical addresses associated with the access operation;

identify one or more physical addresses associated with the one or more logical addresses based at least in part on the mapping indicated by the first subset of the data stored in the first portion of the cache; and update an indicator for indicating whether the data is used for the one or more access operations during the duration based at least in part on identifying the one or more physical addresses based at least in part on the mapping indicated by the first subset of the data.

* * * * *